US009473218B2

(12) United States Patent
Zhu

(10) Patent No.: US 9,473,218 B2
(45) Date of Patent: Oct. 18, 2016

(54) SIGNALING SCHEME FOR COORDINATED TRANSMISSIONS

(71) Applicant: Fujitsu Limited, Kanagawa (JP)

(72) Inventor: Chenxi Zhu, Fairfax, VA (US)

(73) Assignee: Fujitsu Limited, Kawasaki (JP)

( * ) Notice: Subject to any disclaimer, the term of this patent is extended or adjusted under 35 U.S.C. 154(b) by 602 days.

(21) Appl. No.: 13/861,130

(22) Filed: Apr. 11, 2013

(65) Prior Publication Data

US 2013/0301526 A1 Nov. 14, 2013

Related U.S. Application Data

(60) Provisional application No. 61/645,484, filed on May 10, 2012.

(51) Int. Cl.
*H04B 7/02* (2006.01)
*H04W 52/40* (2009.01)
*H04L 5/00* (2006.01)

(52) U.S. Cl.
CPC ............ *H04B 7/024* (2013.01); *H04L 5/0007* (2013.01); *H04L 5/0091* (2013.01); *H04W 52/40* (2013.01)

(58) Field of Classification Search
CPC .... H04W 80/04; H04W 84/12; H04W 88/06
See application file for complete search history.

(56) References Cited

U.S. PATENT DOCUMENTS

| | | | |
|---|---|---|---|
| 2011/0038310 A1 | 2/2011 | Chmiel et al. | |
| 2011/0141987 A1 | 6/2011 | Nam et al. | 370/329 |
| 2011/0194527 A1* | 8/2011 | Lin | H04B 7/022 370/330 |
| 2011/0274047 A1* | 11/2011 | Kwon | H04W 52/40 370/328 |
| 2012/0004007 A1* | 1/2012 | Zhou | H04W 52/06 455/522 |
| 2012/0207105 A1* | 8/2012 | Geirhofer | H04L 5/0032 370/329 |
| 2012/0307761 A1 | 12/2012 | Zhang et al. | 370/329 |
| 2013/0287064 A1* | 10/2013 | Seo | H04J 13/18 375/144 |

OTHER PUBLICATIONS

3rd Generation Partnership Project;Technical Specification Group Radio Access Network; Evolved Universal Terrestrial Radio Access (E-UTRA); Physical channels and modulation (Release 10), TS.36.211-a40; 103 pages, Jan. 2012.

3rd Generation Partnership Project;Technical Specification Group Radio Access Network; Evolved Universal Terrestrial Radio Access (E-UTRA); Multiplexing and channel coding (Release 10), TS.36.212-a40; 81 pages, Jan. 2012.

(Continued)

*Primary Examiner* — Andrew Lai
*Assistant Examiner* — Zhiren Qin
(74) *Attorney, Agent, or Firm* — Baker Botts L.L.P.

(57) ABSTRACT

A method of signal transmission in a wireless communications network is disclosed. The method includes identifying a particular transmission point to transmit to a mobile device in a particular transmission and determining whether the particular transmission point will operate at a power level equivalent to that of a serving cell of the mobile device. The method further includes transmitting to the mobile device an identification of the value of a cell-specific parameter associated with the cell of the particular transmission point, if the particular transmission point will not operate at a power level equivalent that of the serving cell. The method still further includes transmitting to the particular transmission point an identification of a value of the cell-specific parameter associated with the serving cell, if the particular transmission point will operate at a power level equivalent to a power level of the serving cell.

14 Claims, 3 Drawing Sheets

(56) References Cited

OTHER PUBLICATIONS

3rd Generation Partnership Project;Technical Specification Group Radio Access Network; Evolved Universal Terrestrial Radio Access (E-UTRA); Physical layer procedures (Release 10), TS.36.213-a40; 127 pages, Jan. 2012.
3rd Generation Partnership Project;Technical Specification Group Radio Access Network; Evolved Universal Terrestrial Radio Access (E-UTRA); Physical layer procedures (Release 10), TS.36.213; 125 pages, Mar. 2012.
3GPP RP-111365, WI/SI Coordinated Multi-Point Operation for LTE, RAN#63; 27 pages, Sep. 15, 2011.
International Search Report and Written Opinion; PCT/US2013/031568; pp. 17, Jan. 30, 2014.
Samsung; "Design Considerations for COMP Joint Transmission"; 3GPP TSG RAN WG1 Meeting # 57; pp. 9, 2009.
Panasonic; "Required Information at the UE in CoMP"; 3GPP TSG RAN WG1 Meeting # 57bis; pp. 2, 2009.
Texas Instruments; "Downlink Control Signaling for DL CoMP"; 3GPP TSG RAN WG1 Meeting # 67; pp. 2, 2011.
Fujitsu; "Discussion of DL CoMP Control Signaling"; 3GPP TSG RAN WG1 #69; pp. 4, 2012.
Office action in Japanese Patent Application No. 2015-511461; with English translation; 4 pages, Feb. 28, 2016.
Office action in Korean Patent Application No. 2016-7001083; with English translation; 7 pages, Mar. 8, 2016.
Intel: "Downlink control signaling for DL CoMP," 3GPP TSG-RAN WG1 #68bis; Jeju, Korea; R1-121517; 4 pages, Mar. 26-30, 2012.
Samsung: "CoMP Feedback including preferred-TP indicator," 3GPP TSG RAN WG1 #68bis; Jeju, Korea; R1-121622, 6 pages, Mar. 26-30, 2012.
3rd Generation Partnership Project; Technical Specification Group Radio Access Network; Coordinated multi-point operation for LTE physical layer aspects (Release 11), 3GPP TR 36.819 V11.0.0; 68 pages, Sep. 2011.
3rd Generation Partnership Project; Technical Specification Group Radio Access Network; Evolved Universal Terrestrial Radio Access (E-UTRA); Physical Channels and Modulation (Release 10), 3GPP TS 36.211 V10.4.0; 101 pages, Dec. 2011.
3rd Generation Partnership Project; Technical Specification Group Radio Access Network; Evolved Universal Terrestrial Radio Access (E-UTRA); Multiplexing and channel coding (Release 10), 3GPP TS 36.212 V10.4.0; 79 pages, Dec. 2011.
3rd Generation Partnership Project; Technical Specification Group Radio Access Network; Evolved Universal Terrestrial Radio Access (E-UTRA); Physical layer procedures (Release 10), 3GPP TS 36.213 V10.4.0; 126 pages, Dec. 2011.
Office action in Japanese Patent Application No. 2015-511461; with English translation; 4 pages, Feb. 16, 2016.
International Search Report and Written Opinion; PCT/US2013/040283; pp. 14, Oct. 30, 2013.
Samsung; "Downlink power allocation for CoMP"; 3GPP TSG-RAN WG1#68bis Meeting; Jeju, Korea; pp. 4, 2012.
MediaTek; "Further Discussions of Standardization Impacts on CoMP"; 3GPP TSG-RAN WG1 #66; Athens, Greece; pp. 3, 2011.
Hitachi Ltd.; "Discussion on RRM/CoMP Measurement Set Management"; 3GPP TSG-RAN WG1 #68; Dresden, Germany; pp. 4, 2012.
New Postcom; "Downlink CSI-RS signaling design for LTE-Advanced"; 3GPP TSG RAN WG1 Meeting #62; Madrid, Spain; pp. 5, 2010.
Fujitsu; "Discussion of transmission power setting for DL CoMP"; 3GPP TSG RAN WG1 #69; pp. 4, 2012.
Office Action, Japanese Patent Application No. 2015-511461; with English translation; 6 pages, May 31, 2016.
"Downlink Control Signalling and Transmission Modes for CoMP," Alcatel-Lucent, Alcatel-Lucent Shanghai Bell, 3GPP TSG-RAN WG1#68bis Jeju, Korea, R1-121244, 2 pages, Mar. 26, 2012.
Office Action, Korean Patent Application No. 10-2014-7029040; with English translation; 7 pages, May 30, 2016.

\* cited by examiner

SIGNALING SCHEME FOR COORDINATED TRANSMISSIONS

RELATED APPLICATION

This application claims benefit under 35 U.S.C. §119(e) of U.S. Provisional Patent Application No. 61/645,484, entitled Signaling Scheme For Downlink Coordinated Multi-Point Processing and filed 10 May 2012, and U.S. Provisional Patent Application No. 61/645,309, entitled Signaling Scheme For Downlink Coordinated Multi-Point Processing and filed 10 May 2012, which are hereby incorporated by reference in their entirety.

TECHNICAL FIELD

This disclosure relates generally to communication networks and, more particularly, to wireless communication networks.

BACKGROUND

Long-Term Evolution-Advanced (LTE-A) may become the dominant standard for fourth-generation (4G) wireless technology. The current version of the LTE-A standard is Release 11 (Rel. 11), and a particular feature of Rel. 11 is Coordinated Multi-point Processing (CoMP). Down link (DL) CoMP is a special type of transmission in which the multiple transmission antennas of one or more transmission points transmit to receiver antennas located on the user equipment (UE).

SUMMARY

In one embodiment, a method of signal transmission in a wireless communications network is disclosed. The method includes identifying a particular transmission point to transmit data to a mobile device in a particular transmission and determining whether the particular transmission point will operate at a power level equivalent to a power level of a serving cell of the mobile device. The method further includes transmitting to the mobile device an identification of the value of a cell-specific parameter associated with the cell of the particular transmission point, if the particular transmission point will not operate at a power level equivalent to a power level of a serving cell of the mobile device. The method still further includes transmitting to the particular transmission point an identification of a value of the cell-specific parameter associated with the serving cell of the mobile device, if the particular transmission point will operate at a power level equivalent to a power level of a serving cell of the mobile device.

In another embodiment, a system for transmitting signals in a wireless communications network is disclosed. The system includes a plurality of base stations, one of which is configured to serve as a lead base station for a particular transmission, and a plurality of transmission points, each of which is associated with one of the plurality of base stations. The lead base station is configured to identify a particular transmission point of the plurality of transmission points to transmit data to a mobile device in a particular transmission and determine whether the particular transmission point will operate at a power level equivalent to a power level of a serving cell of the mobile device. The lead base station is further configured to transmit to the mobile device an identification of the value of a cell-specific parameter associated with the cell of the particular transmission point, if the particular transmission point will not operate at a power level equivalent to a power level of a serving cell of the mobile device. The lead base station is still further configured to transmit to the particular transmission point an identification of the value of the cell-specific parameter associated with the serving cell of the mobile device, if the particular transmission point will operate at a power level equivalent to a power level of a serving cell of the mobile device.

In yet another embodiment, a method of signal transmission in a wireless communications network is disclosed. The method includes identifying a particular set of transmission points that can be utilized to transmit data to a mobile device in a particular transmission and selecting a value of a mobile-device-specific parameter $\rho_C$, wherein parameter $\rho_C$ may be used to derive an energy per resource element (EPRE) of a physical downlink shared channel (PDSCH). The method further includes transmitting the value of parameter $\rho_C$ to the mobile device.

In still another embodiment, a system for transmitting signals in a wireless communications network is disclosed. The system includes a plurality of base stations, one of which is configured to serve as a lead base station for a particular transmission, and a plurality of transmission points, each of which is associated with one of the plurality of base stations. The lead base station is configured to identify a particular set of transmission points that can be utilized to transmit data to a mobile device in a particular transmission and select a value of a mobile-device-specific parameter $\rho_C$, wherein the value of parameter $\rho_C$ may be used to derive an energy per resource element (EPRE) of a physical downlink shared channel (PDSCH). The lead base station is further configured to transmit the value of parameter $\rho_C$ to the mobile device.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Particular embodiments and their advantages are best understood by reference to FIGS. 1 through 4, wherein like numbers are used to indicate like and corresponding parts.

This disclosure sets forth methods and systems for improving transmission quality in a wireless network. For example, the methods and systems disclosed herein may be used in Long-Term Evolution-Advanced (LTE-A) Down link (DL) Coordinated Multi-point Processing (CoMP) joint transmissions to communicate to a mobile device the effective power per resource element for a physical downlink shared channel (PDSCH).

Figure 1:
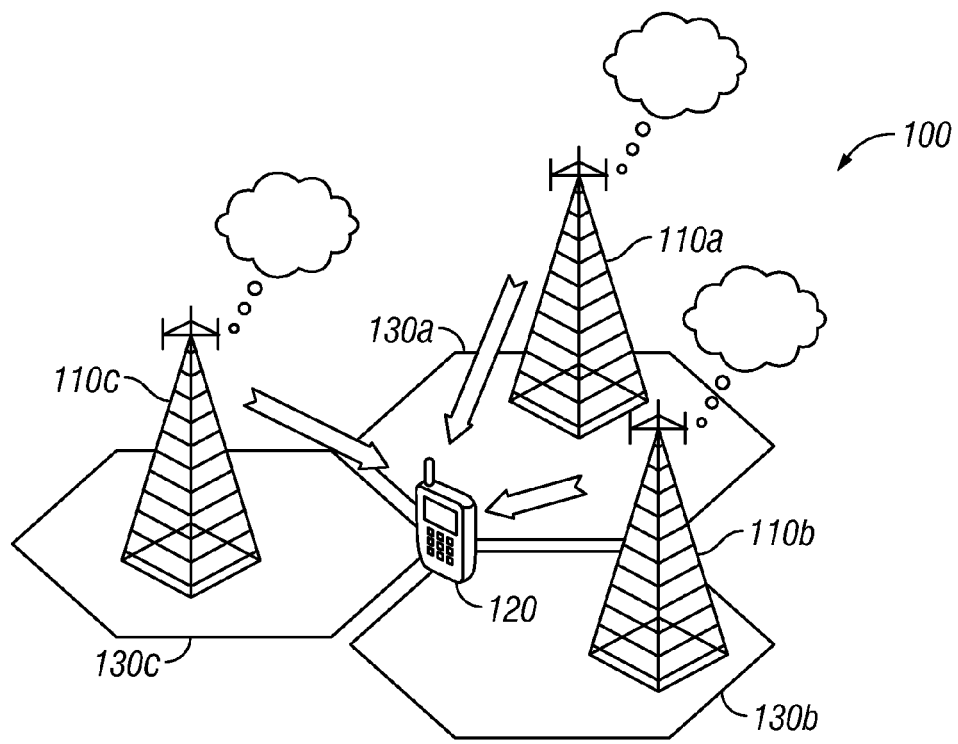
FIG. 1 is a diagram of an example wireless communications network in accordance with one embodiment of the present disclosure.

FIG. 1 illustrates an example wireless communications network 100 in accordance with the present disclosure. Wireless communications network 100 may be a Long-Term Evolution (LTE) network, an LTE-A network, or a combination of two or more such networks. Wireless communications network 100 may include base stations 110a, 110b, and 110c and mobile device 120. Although FIG. 1 depicts three base stations 110a, 110b, and 110c, wireless communications network 100 may include any suitable number of base stations 110. Similarly, wireless communications network 100 may include any suitable number of mobile devices 120 that communicate with base stations 110.

Base stations 110 may be referred to as Node B for 3rd generation (3G) cellular networks (e.g., Universal Mobile Telecommunications Systems or UMTS networks) or evolved Node B (eNB) for an LTE network. As shown in FIG. 1, base stations 110a, 110b, and 110c may be located in adjacent cells 130a, 130b, and 130c, respectively. Cells 130 may include both base stations 110 and non-base-station transmission points, which are not depicted in FIG. 1. Cells 130 may have any suitable shape. One of cells 130 may be designated by wireless communications network 100 as a serving cell for mobile device 120.

Base stations 110 may include any combination of hardware, software embedded in a computer readable medium and/or encoded logic incorporated in hardware or otherwise stored (e.g., firmware) to implement any number of communication protocols that allow for wired or wireless exchange of packets in wireless communication network 100. As used herein, the term computer-readable medium may include storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; and/or any combination of the foregoing.

Base stations 110 may include one or more antennas, which may also be referred to as transmission points. Transmission points may be any suitable type of antenna capable of transmitting and receiving data or signals wirelessly. For example, transmission points may include omni-directional, sector, or panel antennas operable to transmit/receive radio signals at any suitable frequency, such as between 2 GHz and 66 GHz. Each transmission point may provide wireless coverage to a particular building, city block, neighborhood, or any other geographic area. In some embodiments, transmission points may be located remotely from base stations 110, but may nonetheless function as an extension of base stations 110.

Base stations 110 may communicate with mobile device 120 via wireless communication through the one or more transmission points. Base stations 110 may communicate with mobile device 120 using a variety of different wireless technologies, including, but not limited to, orthogonal frequency division multiple access (OFDMA) and the LTE-A protocol as defined in the 3rd Generation Partnership Project (3GPP) Release 10 or beyond. In certain embodiments, an LTE-A network may include multiple protocol layers including both physical (PHY) and logical layers (e.g., a medium-access control (MAC) layer). Data may be mapped to a particular layer based on its quality-of-service requirements.

Mobile device 120 may be a portable computer or computing device including functionality for communicating over a network. For example, mobile device 120 may be a mobile phone, a tablet computer, a laptop computer, a handheld game console, an electronic book reader, or any other suitable portable device. Mobile device 120 may also be referred to as user equipment (UE). Mobile device 120 may connect to wireless communications network 100 via one or more base stations 110 of wireless communications network 100. Communications between mobile device 120 and wireless communications network 100 may be single-point to single-point (e.g., between one or more antennas of a single base station 110 and one or more antennas of mobile device 120). Alternatively, communications between mobile device 120 and wireless communications network 100 may be multi-point to single-point (e.g., between one or more antennas of multiple base stations 110 and one or more antennas of mobile device 120).

Multi-point to single-point transmissions may be accomplished through down link coordinated multi-point processing (DL CoMP), wherein multiple transmitting antennas are located at multiple geographically separated locations. For example, data may be simultaneously transmitted to mobile device 120 from multiple geographically separated points in wireless communications network 100. The data may be transmitted to mobile device 120 through coordination among the multiple transmission points. For example, in a joint transmission involving three base stations 110, there may be multiple transmission points that transmit to mobile device 120 simultaneously in the same physical resource block. In each joint transmission, one of the base stations 110 may be designated as the lead, or controlling, base station 110. For example, lead base station 110 may coordinate the transmissions from the base stations 110 participating in the joint transmission, encode the data to be transmitted to mobile device 120, and send the encoded data to the transmission points participating in the joint transmission. As another example, lead base station 110 may select a particular transmission point to transmit to mobile device 120 and send the encoded data to the particular transmission point.

Figure 2:
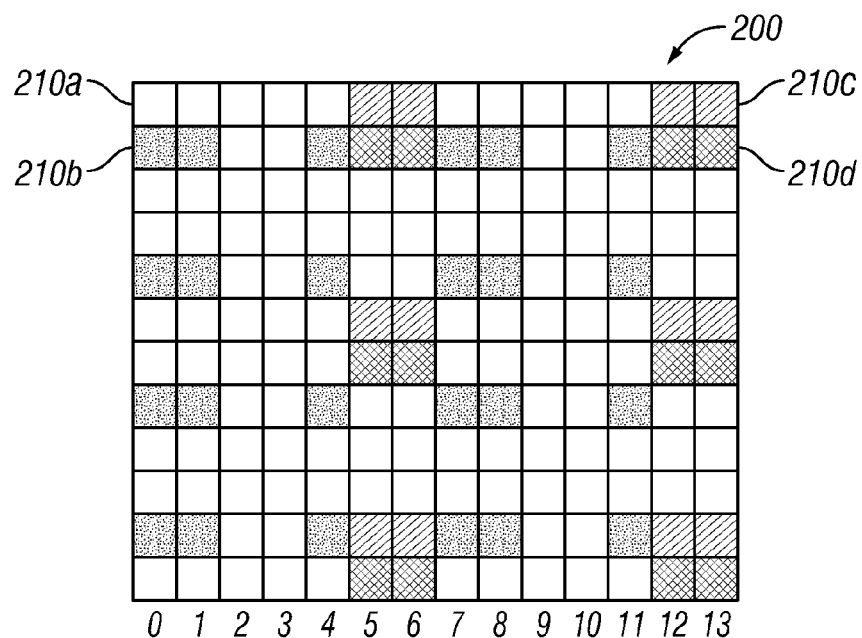
FIG. 2 is a diagram of an example allocation of resource elements of a radio frame in accordance with one embodiment of the present disclosure.

FIG. 2 illustrates an example physical resource block 200 in accordance with the present disclosure. Physical resource block 200 may include a plurality of resource elements 210 of a radio head, which may be part of a base station 110 or other non-base-station transmission point. In an LTE-A communication network, a physical resource block may include twelve contiguous subcarrier frequencies, each transmitting six or seven data symbols, referred to as orthogonal frequency division multiplex (OFDM) symbols, in a given amount of time. An OFDM symbol may be a complex number with real or imaginary components that map a group of bits to one or more modulation characteristics of a carrier wave transmitted at a particular subcarrier frequency. OFDM symbols may be individually modulated and separated in frequency such that they do not interfere with one another. Lead base station 110 may determine the downlink energy per resource element (EPRE). The EPRE may represent the power level of OFDM symbols transmitted in resource elements 210.

Various types of information may be sent to mobile device 120 via the resource elements 210 of physical resource block 200. For example, one or more base stations 110, each having at least one transmission point, may send data traffic and control traffic to mobile device 120 using physical layers of wireless communications network 100. The physical layers may include, for example, a physical downlink shared channel (PDSCH) and/or a physical downlink control channel (PDCCH), as defined in the LTE-A protocol. Data traffic may, for example, include information that a base station 110 receives from wireless communications network 100 or from another base station 110. As an example, data traffic may be sent to mobile device 120 via the PDSCH.

Control traffic, on the other hand, may be used to establish and maintain a connection between one or more transmission points and mobile device 120. Control traffic may include information that allows mobile device 120 to extract relevant data traffic from transmissions sent from base stations 110. As an example, control traffic may be sent to mobile device 120 via the PDCCH. Control traffic may include Channel State Information Reference Signals (CSI-RS), which may be transmitted periodically by each transmission point. For example, each base station 110a, 110b, and 110c may include a transmission point TP1, TP2, and TP3, respectively, each of which transmits a CSI-RS. CSI-RS may be used by mobile device 120 to obtain channel-state information (e.g., information regarding the channels on which a mobile device can receive transmissions). Mobile device 120 may report which CSI-RS signals it receives to the lead base station 110. Based on this information, the lead base station may determine which transmission points may be used to transmit data to mobile device 120.

Additionally, control traffic may include cell-specific reference signals (CRS), which may be transmitted by a transmission point associated with each base station. Each base station 110a, 110b, and 110c may, for example, include a transmission point TP1, TP2, and TP3, respectively, which may transmit its own CRS. For example, TP1 may transmit a first CRS (CRS1) in resource elements 210a, TP2 may transmit a second CRS (CRS2) in resource elements 210b, and TP3 may transmit a third CRS (CRS3) in resource elements 210c. The particular set of resource elements in which each transmission point transmits CRS may be fixed.

Control traffic may also include demodulation reference signals (DM-RS). In certain embodiments each transmission point involved in a joint transmission may transmit DM-RS. DM-RS may be a mobile-device-specific reference signal; thus, the same DM-RS sequence may be transmitted from each transmission point in a joint transmission.

As discussed above, lead base station 110 may determine the EPRE for resource elements 210, which may represent the power level of OFDM symbols transmitted in resource elements 210. In order to decode the data transmitted via the PDSCH, mobile device 120 may need to know the EPRE of resource elements 210 of physical resource block 200. Under Release 10 of the LTE-A standard, mobile device 120 may derive the EPRE using the value of two parameters: $\rho_A$, $\rho_B$, the values of which may be transmitted to mobile device 120 via logical layer signaling. For example, in resource elements not including CRS or DM-RS, the PDSCH EPRE may be represented by the following equation: PDSCH EPRE=$\rho_A$*(CRS EPRE), where CRS EPRE is the EPRE of the resource elements designated for CRS. In resource elements including CRS, the PDSCH EPRE may be represented by the following equation: PDSCH EPRE=$\rho_B$*(CRS EPRE), where CRS EPRE is the EPRE of the resource elements designated for CRS.

Parameter $\rho_A$ may be a mobile-device-specific parameter, while parameter $\rho_B$ may be a cell-specific parameter. As stated above, the values of parameters $\rho_A$ and $\rho_B$ may be transmitted to mobile device 120 via logical layer signaling. Mobile device 120 may receive such logical layer transmissions from transmission points located within the serving cell of mobile device 120, but not from transmission points located outside the serving cell of mobile device 120. Because parameter $\rho_A$ is mobile-device-specific, the value of parameter $\rho_A$ will not vary based on the transmission point (s) used in the transmission. Thus, regardless of the transmission point(s) involved in a particular transmission, mobile device 120 may utilize the value of parameter $\rho_A$ received via logical layer signaling from transmission points located within the serving cell of mobile device 120.

Parameter $\rho_B$, on the other hand, is a cell-specific parameter. Thus, mobile device 120 may need to know the value of parameter $\rho_B$ for the cell of the transmission point(s) involved in the transmission. Because the value of parameter $\rho_B$ may be transmitted to mobile device 120 via logical layer signaling, mobile device 120 may not receive the value of parameter $\rho_B$ for transmission points located outside the serving cell of mobile device 120.

Consider, for example, a transmission involving a single transmission point, mobile device 120 may not be notified of the value of parameter $\rho_B$ for the cell of the transmission points involved in the transmission. The use by mobile device 120 of a value for parameter $\rho_B$ that is inconsistent with the value for the cell of the transmission points may result in an error in calculating the EPRE of the PDSCH. To avoid this problem, a signaling scheme may be implemented in which mobile device 120 is notified of the value of parameter $\rho_B$ for the transmission points involved in a particular transmission. Such a signaling scheme is discussed in detail in conjunction with FIG. 3 below.

As another example, consider a transmission involving multiple transmission points, mobile device 120 may not be notified of the values of parameter $\rho_B$ for transmission points located outside the serving cell of the mobile device. Even if mobile device 120 were notified of the values of parameter $\rho_B$ for each of the transmission points, mobile device 120 may not be configured to use multiple values of parameter $\rho_B$ to derive the joint PDSCH EPRE of the multiple transmission points. To avoid this problem, a signaling scheme may be implemented in which the PDSCH EPRE is derived without using parameter $\rho_B$. Such a signaling scheme is discussed in detail in conjunction with FIG. 4 below.

Figure 3:
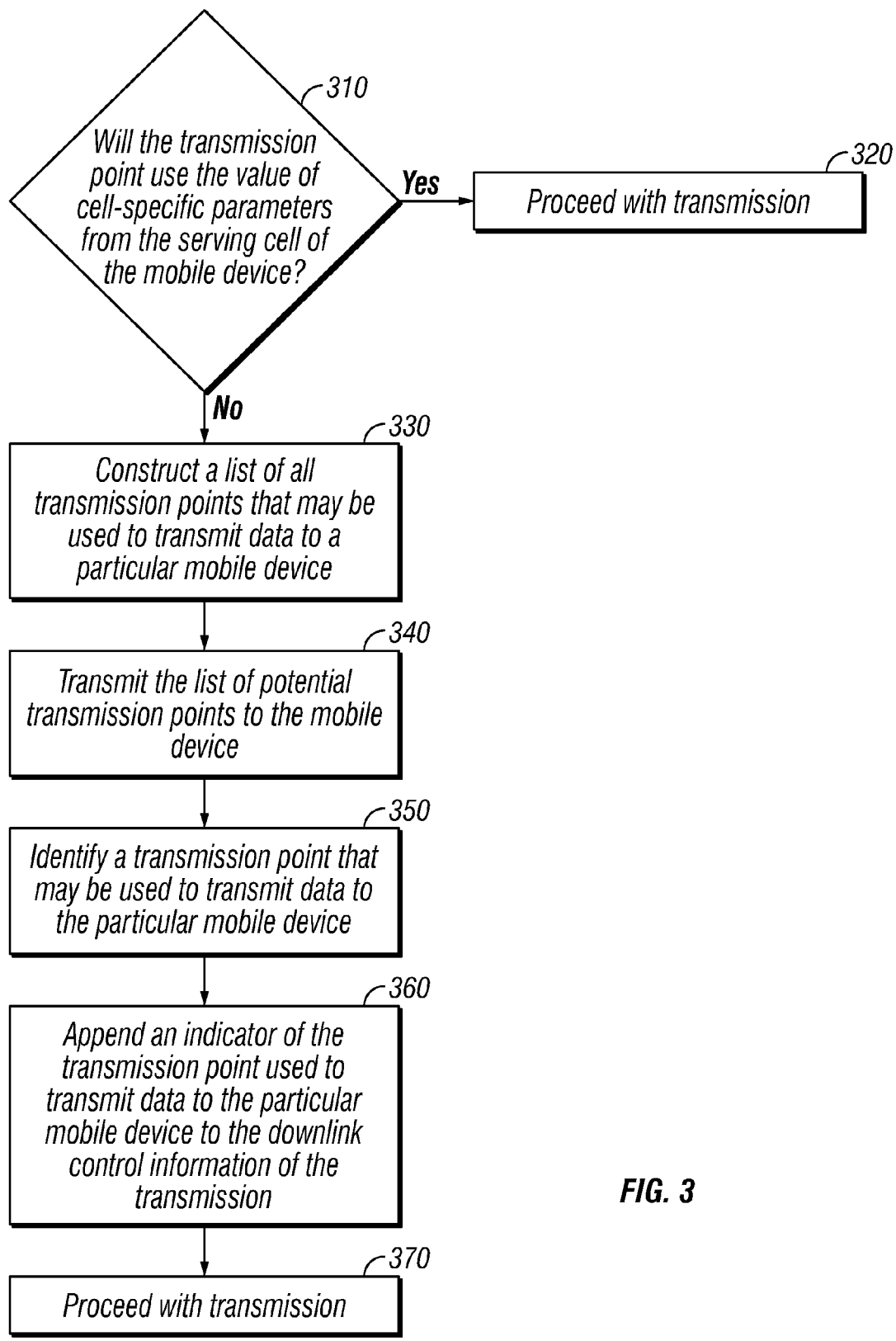
FIG. 3 is a flow chart of an example method for signal transmission in a wireless communications network in accordance with one embodiment of the present disclosure.

FIG. 3 illustrates an example method 300 of notifying mobile device 120 of the value of parameter $\rho_B$ for the transmission point involved in a particular transmission. Method 300 may be implemented in transmissions involving a single transmission point located outside the serving cell of mobile device 120.

In some embodiments, the transmission point may be configured to operate at a downlink energy per resource element (EPRE) equivalent to that of the serving cell of mobile device 120. Thus, mobile device 120 may utilize the value of parameter $\rho_B$ received via logical layer signaling from a transmission point in the serving cell of mobile device 120.

In other embodiments, mobile device 120 may be notified of the transmission point involved in a particular transmission and the values of parameter $\rho_B$ associated with those transmission points. Mobile device 120 could be notified of the transmission point involved in a particular transmission by including an indicator of the transmission point (or points) in the Downlink Control Information (DCI) of the transmission, but this may result in increased DCI overhead. To avoid an increase in DCI overhead, a signaling scheme combining logical layer signaling with DCI signaling may be implemented. For example, lead base station 110 may identify a set of transmission points that may be utilized to transmit data to mobile device 120. As discussed above, each transmission point may periodically transmit a CSI-RS. Mobile device 120 may report to lead base station 110 which CSI-RS signals mobile device 120 receives and, based on that information, lead base station 110 may determine which transmission points may be utilized to transmit data to mobile device 120. Lead base station 110 may construct an indexed list of all the transmission points that may be utilized to transmit data to mobile device 120. The indexed list may, for example, include the identity of each potential transmission point as well as the value of parameter $\rho_B$ associated with each potential transmission point. The indexed list may be transmitted to the mobile device via logical layer signaling. Additionally, an indicator of the transmission point that will be utilized in the transmission may be appended to the DCI for the transmission. In this manner, the mobile device may be notified of the transmission point involved in a particular transmission and the value of parameter $\rho_B$ associated with that transmission point.

Method 300 may begin at step 310. At step 310, a determination may be made regarding whether a particular transmission will be configured such that the transmission point involved in the transmission operates at a downlink energy per resource element (EPRE) equivalent to that of the serving cell of the mobile device. If so, the method may proceed to step 320. At step 320, the transmission may proceed. As discussed above, where the transmission point is configured to operate at a downlink energy per resource element (EPRE) equivalent to that of the serving cell of the mobile device, no additional signaling is necessary because the mobile device may utilize the value of parameter $\rho_B$ received via logical layer signaling from transmission points located within the serving cell of the mobile device.

If, on the other hand, the transmission will not be configured such that the transmission point involved in the transmission does not operate at a downlink energy per resource element (EPRE) equivalent to that of the serving cell of the mobile device, the method may proceed to step 330. At step 330, a lead base station may identify a set of transmission points that may be utilized to transmit data to a particular mobile device. As discussed above, each transmission point may periodically transmit a CSI-RS. The mobile device may report which CSI-RS signals it receives to the lead base station and, based on that information, the lead base station may determine which transmission points may be utilized to transmit data to the mobile device. The lead base station may construct an indexed list of all the transmission points that may be utilized to transmit data to the mobile device. The indexed list may include the identity of each potential transmission point as well as the value of parameter $\rho_B$ associated with each transmission point.

At step 340, the mobile device may be notified of transmission points that may be utilized to transmit data to a particular mobile device and the value of parameter $\rho_B$ associated with each potential transmission point. For example, the indexed list created at step 330 may be transmitted to the mobile device via logical layer signaling.

At step 350, the lead base station may identify a particular transmission point that will be used to transmit data to the mobile device. As discussed above, each transmission point may periodically transmit a CSI-RS. The mobile device may report which CSI-RS signals it receives to the lead base station, and, based on that information, the lead base station may determine which transmission points may be utilized to transmit data to the mobile device. From the set of potential transmission points identified at step 330, the lead base station may identify a particular transmission point that will be used to transmit data to the mobile device.

At step 360, an indicator of the particular transmission point that will be utilized in the transmission may be appended to the DCI for the transmission. In this manner, the mobile device may be notified of the particular transmission point that will be used to transmit data to the mobile device and the value of parameter $\rho_B$ associated with that transmission point. Once the mobile device has been notified of the particular transmission point that will be used to transmit data to the mobile device and the value of parameter $\rho_B$ associated with that transmission point, the method may proceed to step 370. At step 370, the data transmission to the mobile device may proceed.

Figure 4:
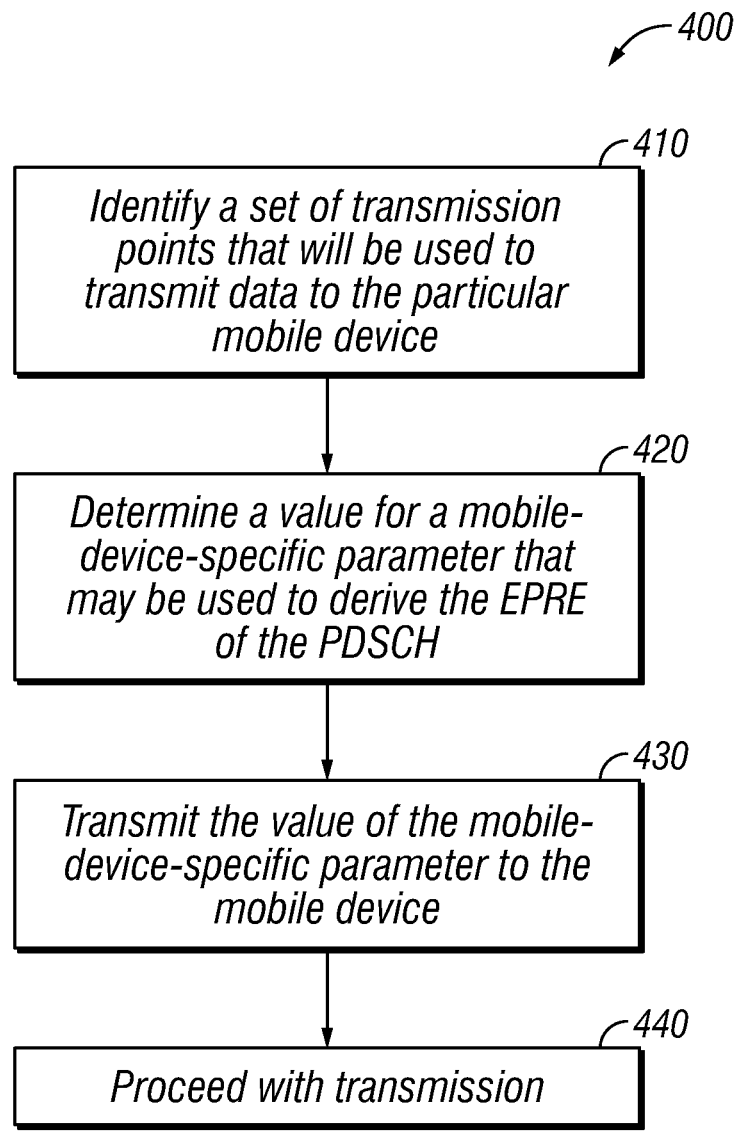
FIG. 4 is a flow chart of an example method for signal transmission in a wireless communications network in accordance with another embodiment of the present disclosure.

FIG. 4 illustrates an example method 400 of signal transmission in which the PDSCH EPRE may be derived without using parameter $\rho_B$. Method 400 may be implemented in transmissions involving transmission points from different cells. As discussed above, in a transmission involving multiple transmission points from different cells, the mobile device to which data is being transmitted may not be notified of the values of parameter $\rho_B$ associated with each transmission point. Even if the mobile device were notified of the values of parameter $\rho_B$ associated with each of the transmission points, the mobile device may not be configured to use multiple values of parameter $\rho_B$ to derive the joint PDSCH EPRE of the multiple transmission points. To avoid this problem, a signaling scheme may be implemented in which the PDSCH EPRE is derived without using parameter $\rho_B$.

For example, instead of using parameter $\rho_B$, the mobile device may be configured to derive the PDSCH EPRE using mobile-device-specific parameter $\rho_C$, which may be transmitted to the mobile device via logical layer signaling. The lead base station may determine a value of parameter $\rho_C$ such that parameter $\rho_C$ may be used to derive the PDSCH EPRE for a particular set of transmission points. For example, in resource elements not including DM-RS, parameter $\rho_C$ may represented by the following equation: $\rho_C$=(PDSCH EPRE)/(DM-RS EPRE), where DM-RS EPRE is the EPRE of resource elements designated for DM-RS. In resource elements including not including DM-RS (e.g., resource elements that include CRS, but not DM-RS or resource elements that include neither CRS nor DM-RS), the parameter $\rho_C$ may be defined as a set of discrete real numbers that approximates the ratio of PDSCH EPRE to CRS EPRE, where CRS EPRE is the EPRE of resource elements designated for CRS.

Method 400 may begin at step 410. At step 410, the lead base station may identify a particular set of transmission points that will be used to transmit data to the mobile device. As discussed above, each transmission point may periodically transmit a CSI-RS. The mobile device may report which CSI-RS signals it receives to the lead base station, and, based on that information, the lead base station may determine which transmission points may be utilized to transmit data to the mobile device. From the set of potential transmission points, the lead base station may identify a particular set of transmission points that will be used to transmit data to the mobile device.

At step 420, the lead base station may determine a value of parameter $\rho_C$. The value of parameter $\rho_C$ may be set such that the PDSCH EPRE may be derived using mobile-device-specific parameter $\rho_C$. As discussed above, in resource elements not including DM-RS, parameter $\rho_C$ may be represented by the following equation: $\rho_C$=(PDSCH EPRE)/(DM-RS EPRE), where DM-RS EPRE is the EPRE of resource elements designated for DM-RS. In resource elements not including DM-RS, the parameter $\rho_C$ may be defined as a set of discrete real numbers that approximates the ratio of PDSCH EPRE to CRS EPRE.

At step 430, the mobile device may be notified of the of the value of parameter $\rho_C$ via logical layer signaling. Once the mobile device has been notified of the value of parameter $\rho_C$, the mobile device may derive the PDSCH EPRE using parameter $\rho_C$ and the method may proceed to step 440. At step 440, the data transmission to the mobile device may proceed.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present invention have been described in detail, it should be understood that the various changes, substitutions, and alterations could be made hereto without departing from the spirit and scope of the invention.

What is claimed is:

1. A method of signal transmission in a wireless communications network, the method comprising:
   identifying a particular transmission point to transmit data to a mobile device in a particular transmission;
   determining whether the particular transmission point will operate at a power level equivalent to a power level of a serving cell of the mobile device;
   transmitting to the mobile device an identification of a value of a cell-specific parameter associated with a cell of the particular transmission point, if the particular transmission point will not operate at a power level equivalent to a power level of the serving cell of the mobile device; and
   transmitting to the particular transmission point an identification of a value of a cell-specific parameter associated with the serving cell of the mobile device, if the particular transmission point will operate at a power level equivalent to a power level of the serving cell of the mobile device.

2. The method of claim 1, wherein transmitting to the mobile device the identification of the value of the cell-specific parameter associated with the cell of the particular transmission point comprises:
   constructing an indexed list of a particular set of transmission points that are utilized to transmit data to the mobile device, the indexed list including an identification of each transmission point in the particular set of transmission points, and an identification of a value of a cell-specific parameter associated with each transmission point in the particular set of transmission points;
   transmitting the indexed list to the mobile device; and
   transmitting to the mobile device an indicator of the index corresponding to the particular transmission point that is utilized to transmit data to the mobile device in a particular transmission.

3. The method of claim 2, wherein constructing the indexed list of the particular set of transmission points comprises:
   transmitting a reference signal from each of a plurality of transmission points;
   receiving from the mobile device a signal indicating which of the reference signals were received by the mobile device;
   identifying the particular set of transmission points that are utilized to transmit data to the mobile device based on the reference signals received by the mobile device; and
   identifying the value of the cell-specific parameter associated with each transmission point of the particular set of transmission points.

4. The method of claim 2, wherein the indexed list is transmitted to the mobile device through logical layer signaling.

5. The method of claim 2, wherein transmitting the indicator of the index corresponding to the particular transmission point comprises:
   appending the indicator to down-link control information for the particular transmission; and
   transmitting the down-link control information to the mobile device.

6. The method of claim 3, wherein the reference signal transmitted by each of the plurality of transmission points comprises a channel state information reference signal.

7. The method of claim 1, wherein the cell-specific parameter is parameter $\rho_B$.

8. A system for transmitting signals in a wireless communications network, the system comprising:
   a plurality of base stations, one of the plurality of base stations configured to serve as a lead base station for a particular transmission; and
   a plurality of transmission points, each transmission point associated with one of the plurality of base stations;
   the lead base station configured to:
      identify a particular transmission point of the plurality of transmission points to transmit data to a mobile device in a particular transmission;
      determine whether the particular transmission point will operate at a power level equivalent to a power level of a serving cell of the mobile device;
      transmit to the mobile device an identification of a value of a cell-specific parameter associated with a cell of the particular transmission point, if the particular transmission point will not operate at a power level equivalent to a power level of the serving cell of the mobile device; and
      transmit to the particular transmission point an identification of a value of a cell-specific parameter associated with the serving cell of the mobile device, if the particular transmission point will operate at a power level equivalent to a power level of the serving cell of the mobile device.

9. The system of claim 8, wherein transmitting to the mobile device the identification of the value of the cell-specific parameter associated with the cell of the particular transmission point comprises:
   constructing an indexed list of a particular set of transmission points that are utilized to transmit data to the mobile device, the indexed list including an identification of each transmission point in the particular set of transmission points, and an identification of a value of a cell-specific parameter associated with each transmission point in the particular set of transmission points;
   transmitting the indexed list to the mobile device; and
   transmitting to the mobile device an indicator of the index corresponding to the particular transmission point that is utilized to transmit data to the mobile device in a particular transmission.

10. The system of claim 9, wherein:
    each of the plurality of transmission points is configured to transmit a reference signal; and
    the lead base station is further configured to:
       transmit a reference signal from each of a plurality of transmission points;

receive from the mobile device a signal indicating which of the reference signals were received by the mobile device;

identify the particular set of transmission points that are utilized to transmit data to the mobile device based on the reference signals received by the mobile device; and identify the value of the cell-specific parameter associated with each transmission point of the particular set of transmission points.

11. The system of claim 10, wherein the reference signal transmitted by each of the plurality of transmission points comprises a channel state information reference signal.

12. The system of claim 9, wherein the indexed list is transmitted to the mobile device through logical layer signaling.

13. The system of claim 9, wherein transmitting the indicator of the index corresponding to the particular transmission point comprises:

appending the indicator to down-link control information for the particular transmission; and transmitting the down-link control information to the mobile device.

14. The system of claim 8, wherein the cell-specific parameter is parameter $\rho_B$.

* * * * *